(12) United States Patent
Vivanco et al.

(10) Patent No.: US 12,082,044 B2
(45) Date of Patent: Sep. 3, 2024

(54) SMART SELF CELL CONFIGURATION FOR AERIAL BASE STATION OVER 4G/5G NETWORK

(71) Applicants: AT&T Intellectual Property I, L.P., Atlanta, GA (US); AT&T Technical Services Company, Inc., Vienna, VA (US)

(72) Inventors: Daniel Vivanco, Ashburn, VA (US); Slawomir Stawiarski, Carpentersville, IL (US); David Beppler, Duluth, GA (US)

(73) Assignees: AT&T Intellectual Property I, L.P., Atlanta, GA (US); AT&T Technical Services Company, Inc., Vienna, VA (US)

( * ) Notice: Subject to any disclaimer, the term of this patent is extended or adjusted under 35 U.S.C. 154(b) by 131 days.

(21) Appl. No.: 18/047,088

(22) Filed: Oct. 17, 2022

(65) Prior Publication Data
US 2023/0064589 A1 Mar. 2, 2023

Related U.S. Application Data

(63) Continuation of application No. 16/951,712, filed on Nov. 18, 2020, now Pat. No. 11,510,102.

(51) Int. Cl.
*H04W 28/08* (2023.01)
*H04B 7/185* (2006.01)
(Continued)

(52) U.S. Cl.
CPC .... *H04W 28/0838* (2020.05); *H04B 7/18506* (2013.01); *H04W 28/0958* (2020.05);
(Continued)

(58) Field of Classification Search
CPC .......... H04B 7/18502–18504; H04W 28/0226; H04W 28/0289; H04W 28/08;
(Continued)

(56) References Cited

U.S. PATENT DOCUMENTS

| 5,768,267 A | 6/1998 | Raith et al. |
| 9,578,574 B2 | 2/2017 | Rubin et al. |

(Continued)

FOREIGN PATENT DOCUMENTS

| EP | 2 938 117 A1 | 10/2015 |
| WO | 2018/164756 A1 | 9/2018 |

(Continued)

OTHER PUBLICATIONS

Zhang et al., "Capacity Enhancement for Next Generation Mobile Networks Using mmWave Aerial Base Station", GLOBECOM 2017—2017 IEEE Global Communications Conference; 7 pages. (Year: 2017).*

(Continued)

*Primary Examiner* — Ronald Eisner
(74) *Attorney, Agent, or Firm* — Guntin & Gust, PLC; Kenneth S. Kwan

(57) ABSTRACT

An architecture for facilitating smart physical cell identity (PCI) configuration for aerial network equipment that can used in terrestrial 4G and/or 5G LTE wireless networking paradigms. A method can comprise: receiving, from core network equipment, an instruction to travel from a first geographic location to a second geographic location, wherein the second geographic location has been determined, by the core network equipment, as representing a hotspot location; traveling from the first geographic location to the hotspot location; based on crossing a boundary associated with the hotspot location, initiating execution of a user equipment relay process that transitions the aerial user (Continued)

equipment from being user equipment to being aerial network equipment; and transmitting to the core network equipment that the user equipment relay process has been successfully initiated.

8 Claims, 10 Drawing Sheets

(51) Int. Cl.
| | |
|---|---|
| *H04W 36/00* | (2009.01) |
| *H04W 48/04* | (2009.01) |
| *H04W 60/04* | (2009.01) |
| *H04W 88/04* | (2009.01) |

(52) U.S. Cl.
CPC ... *H04W 36/0009* (2018.08); *H04W 36/0058* (2018.08); *H04W 48/04* (2013.01); *H04W 60/04* (2013.01); *H04W 88/04* (2013.01)

(58) Field of Classification Search
CPC .......... H04W 28/0831–0838; H04W 28/0958; H04W 36/0009; H04W 36/0055–0058; H04W 60/04; H04W 88/04
See application file for complete search history.

(56) References Cited

U.S. PATENT DOCUMENTS

| | | | |
|---|---|---|---|
| 9,826,415 | B1 | 11/2017 | Byrne |
| 9,866,313 | B1 | 1/2018 | Murphy |
| 9,913,095 | B2 | 3/2018 | Talluri et al. |
| 9,918,234 | B2 | 3/2018 | Zerick et al. |
| 10,015,678 | B2 | 7/2018 | Djordjevic et al. |
| 10,034,209 | B1 | 7/2018 | Nandan et al. |
| 10,045,233 | B2 | 8/2018 | Shoshan et al. |
| 10,148,343 | B2 | 12/2018 | Shaw et al. |
| 10,321,330 | B2 * | 6/2019 | Zerick .................. H04W 24/04 |
| 10,362,492 | B2 | 7/2019 | Shoshan et al. |
| 10,631,175 | B2 | 4/2020 | Djordjevic et al. |
| 10,651,922 | B2 | 5/2020 | Miyakawa et al. |
| 10,743,193 | B2 | 8/2020 | Shoshan et al. |
| 10,772,018 | B2 | 9/2020 | Yeh et al. |
| 2017/0048925 | A1 | 2/2017 | Song et al. |
| 2017/0208512 | A1 | 7/2017 | Aydin et al. |
| 2019/0045406 | A1 | 2/2019 | Kalathil et al. |
| 2019/0306768 | A1 | 10/2019 | Kim et al. |
| 2020/0178090 | A1 | 6/2020 | Murphy |
| 2020/0187072 | A1 | 6/2020 | Hong |
| 2020/0245208 | A1 | 7/2020 | Tsuda et al. |

FOREIGN PATENT DOCUMENTS

| | | |
|---|---|---|
| WO | 2019/034086 A1 | 2/2019 |
| WO | 2019/101837 A1 | 5/2019 |
| WO | 2020/135369 A1 | 7/2020 |

OTHER PUBLICATIONS

"3rd Generation Partnership Project; Technical Specification Group Radio Access Network, Study on Enhanced LTE Support for Aerial Vehicles (Release 15)", 3GPP TR 36.777 V0.0.1 (May 2017), Nov. 28, 2019, 8 pages.
Andryeyev et al., "Increasing the Cellular Network Capacity Using Self-Organized Aerial Base Stations", DroNet '17: Proceedings of the 3rd Workshop on Micro Aerial Vehicle Networks, Systems, and Applications, Jun. 2017, 7 pages.
Mignardi et al., "On the Performance Improvement of a Cellular Network Supported by an Unmanned Aerial Base Station", 2017 29th International Teletraffic Congress (ITC 29), 2017, pp. 7-12.
Sharafeddine et al., "On-Demand Deployment of Multiple Aerial Base Stations for Traffic Offloading and Network Recovery", Computer Networks, 2019, 28 pages.
Singh et al., "Aerial Base Stations for Enabling Cellular Communications during Emergency Situation", 2017 International Conference on Vision, Image and Signal Processing (ICVISP), Osaka, Japan, 2017, pp. 103-108.
Zhang et al., "Capacity Enhancement for Next Generation Mobile Networks Using mmWave Aerial Base Station", GLOBECOM 2017-2017 IEEE Global Communications Conference, 2017, 7 pages.
Zhou et al., "Capacity Enhancement for Hotspot Area in 5G Cellular Networks Using mmWave Aerial Base Station", IEEE Wireless Communications Letters, vol. 8, No. 3, Jun. 2019, pp. 677-680.
Notice of Allowance received for U.S. Appl. No. 16/951,712 dated Jul. 18, 2022, 112 pages.

* cited by examiner

US 12,082,044 B2

SMART SELF CELL CONFIGURATION FOR AERIAL BASE STATION OVER 4G/5G NETWORK

RELATED APPLICATION

The subject patent application is a continuation of, and claims priority to, U.S. patent application Ser. No. 16/951,712, filed Nov. 18, 2020, and entitled "SMART SELF CELL CONFIGURATION FOR AERIAL BASE STATION OVER 4G/5G NETWORK," the entirety of which priority application is hereby incorporated by reference herein.

TECHNICAL FIELD

The disclosed subject matter provides a smart physical cell identity (PCI) configuration system and method for aerial network equipment that can used in terrestrial 4th Generation (4G) and/or 5th Generation (5G) Long Term Evolution (LTE) wireless networking paradigms. The disclosed systems and methods overcome PCI conflicts with existing terrestrial network networking architectures.

BACKGROUND

Mobile network operator (MNO) entities, such as a wireless network operator, can use aerial networking equipment (e.g., aerial base station equipment, aerial access point equipment, aerial eNodeB equipment, aerial gNodeB equipment, and the like) to offload traffic from terrestrial (or land based) networking architectures. Use of aerial networking equipment can ameliorate high traffic volumes due, for example, to special events (e.g., music concerts, political and/or business conventions, tradeshows, sporting events, disaster recovery, etc.).

DETAILED DESCRIPTION

Figure 1:
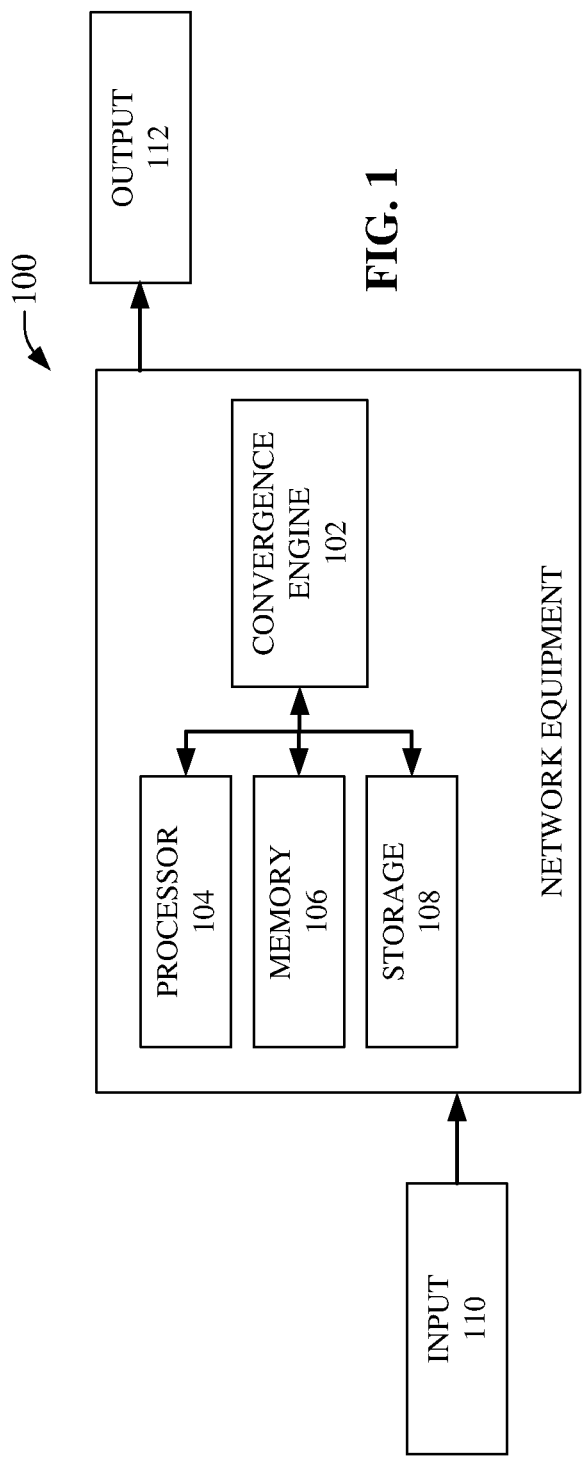
FIG. 1 is an illustration of a system that provides physical cell identity values for aerial network equipment in terrestrial 4G and/or 5G networking applications, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

The disclosed systems and methods, in accordance with various embodiments, provide a system, apparatus, equipment, or device comprising: a processor, and a memory that stores executable instructions that, when executed by the processor, facilitate performance of operations. The operations can comprise receiving, from core network equipment, an instruction to travel from a first geographic location to a second geographic location, wherein the second geographic location has been determined, by the core network equipment, as representing a hotspot location; in response to the receiving, traveling from the first geographic location to the hotspot location; based on arriving at the hotspot location initiating execution of a user equipment relay process that transitions the aerial user equipment from being user equipment to being aerial hybrid user and network equipment; and transmitting to the core network equipment that the user equipment relay process has been successfully initiated.

Additional operations can include: receiving, from the core network equipment, an instruction that directs the aerial hybrid user and network equipment to reject attachment requests received from user equipment located in the hotspot area; receiving, from the core network equipment, an instruction that directs the aerial hybrid user and network equipment to reject handover requests received from user equipment located in the hotspot area; receiving, from the core network equipment, an instruction that directs the aerial hybrid user and network equipment to reject attachment requests received from network equipment located in the hotspot area; and receiving, from the core network equipment, a second instruction that directs the aerial hybrid user and network equipment to reject handover requests received from network equipment located in the hotspot area.

The operations can further comprise: receiving, from the core network equipment, an instruction that directs the aerial hybrid user and network equipment to transmit international mobile subscriber identity data associated with user equipment that attempts attachment or handover to the aerial hybrid user and network equipment; receiving, from the core network equipment, an instruction that directs the aerial hybrid user and network equipment to transmit source-cell-ID data associated with network equipment that attempts handover to the aerial hybrid user and network equipment. In regard to the foregoing, it should be observed that user equipment that attempts attachment to the aerial hybrid user and network equipment can fail and then reattempt the same attachment procedure with terrestrial network equipment which may succeed. The user equipment may then attempt handover to the aerial hybrid user and network equipment and fail again.

Additional operations can comprise: collecting international mobile subscriber identity data associated with user equipment that attempts attachment or attempts handover to the aerial hybrid user and network equipment and collecting the corresponding source-cell-ID data from associated neighboring network equipment, and cross-correlating the international mobile subscriber identity data and the source-cell-ID data from associated neighboring network equipment data to generate a unique list of neighboring network equipment located in hotspot area. In this regard it should be noted that in order effectuate its goals, aerial hybrid user and network equipment needs to collect as many PCIs (e.g., source-cell-IDs) as possible to identify which PCIs have been used in a hotspot area in order to identify and select an unused PCI. Generally, international mobile subscriber identity (imsi) data is used to prove that UE that was rejected by an aerial-eNB attachment procedure and then the procedure attempts HO from neighboring cells. The process "converges" when no new PCIs are reported, even though new user equipment with a new imsi may still try to attach to the network equipment.

Further operations can comprise: receiving, from the core network equipment, an instruction that comprises a physical cell identity value for the to use, wherein the physical cell identity value distinguishes the aerial hybrid user and network equipment from equipment located in the hotspot area.

In accordance with further embodiments, the subject disclosure provides additional systems, apparatuses, equipment, or devices comprising: a processor, and a memory that stores executable instructions that, when executed by the processor, facilitate performance of operations, The operations can comprise: determining, based on measurement report data returned by equipment situated within a defined geographic area, that the equipment is in a traffic overload state; in response to determining that the equipment in the defined geographic area are in the traffic overload state, designating the defined geographic area as being a hotspot area; facilitating aerial user equipment located in a first geographic area to travel to the hotspot area; receiving confirmation, from the aerial user equipment, that the aerial user equipment has crossed over a threshold peripheral boundary that demarcates the hotspot area and that the aerial user equipment has transitioned from being the aerial user equipment to being aerial network equipment; facilitating the aerial network equipment to reject attempts, from equipment located within the hotspot area, to attach to the aerial network equipment; and transmitting, to the aerial network equipment, physical cell identity data representative of the unique identity value, wherein the unique identity value distinguishes the aerial network equipment from the equipment located within the hotspot area.

Additional operation can comprise: determining that the equipment located in the hotspot area is in the overload state based on returned signal strength indicator data, signal to noise data, received channel to power indicator data, and reference signal received power data; facilitating the aerial user equipment to transition to the aerial network equipment by causing the aerial user equipment to initiate execution of a relay process; facilitating the aerial network equipment to change altitudes from a first altitude value to a second altitude value to reduce a number of reported source-cell-ID associated with neighboring equipment located in the hotspot area; and facilitating the aerial network equipment to relocate from a first area within the hotspot area to a second area within the hotspot area.

In regard to the foregoing the hotspot area can be represented as a group of global positioning satellite coordinates that indicate a boundary that surrounds that hotspot area; the unique identity value can have been reserved for use by the aerial network equipment in instances when the core network equipment identifies the traffic overload state; the unique identity value can be randomly assigned to the aerial network equipment in instances when the core network equipment identifies the traffic overload state; and wherein when the unique identity value is a first identity value, additional operations can comprise transmitting a second identity value that replaces the first identity on the aerial network equipment once the core network equipment determines that no additional international mobile subscriber identity values associated with the equipment located within the hotspot area have been reported back via the aerial network equipment within a defined duration of time.

In accordance with still further embodiments, the subject disclosure describes a machine readable medium, a computer readable storage device, or non-transitory machine readable media comprising instructions that, in response to execution, cause a computing system (e.g., equipment, devices, groupings of devices, etc.) comprising at least one processor to perform operations. The operations can include: receiving, from core network equipment, an instruction to travel from a first geographic location to a second geographic location, wherein the second geographic location has been determined, by the core network equipment, as representing a hotspot location; traveling from the first geographic location to the hotspot location; based on crossing a boundary associated with the hotspot location, initiating execution of a user equipment relay process that transitions the aerial user equipment from being user equipment to being aerial network equipment; and transmitting to the core network equipment that the user equipment relay process has been successfully initiated.

In the foregoing context, the first geographic location can be represented as a first collection of geo-location values; and the second geographic location can be represented as a second collection of geo-location values.

Many use cases of unmanned aerial vehicles require beyond visual line-of-site (LOS) communications. Mobile networks offer wide area, high speed, and secure wireless connectivity, which can enhance control and safety of unmanned aerial vehicle operations and enable beyond visual LOS use cases. Existing long term evolution (LTE) networks can support initial drone deployments. LTE evolution and fifth generation (5G) can provide more efficient connectivity for wide-scale drone deployments. New and exciting applications for drones are emerging. A potential business area for mobile network operators. Use cases of commercial UAVs are growing rapidly, including delivery, communications and media, inspection of critical infrastructure, surveillance, search-and-rescue operations, agriculture, etc.

Research and development of current mobile broadband communication (e.g., LTE) has been primarily devoted to terrestrial communication. Providing tether-less broadband connectivity for unmanned aerial vehicles is an emerging field.

Mobile network operator (MNO) entities, such as wireless network operators, can use unmanned aerial vehicles (UAVs) comprising networking equipment such as base station equipment, access point equipment, eNodeB equipment, gNodeB equipment, etc. to offload network traffic from land based networking architectures in order to better manage data flows between collections or groups of equipment, such as user equipment and disparate networking equipment). In some instance wireless network operators can employ defined or specifically designed aerial networking equipment (e.g., aerial base station equipment, aerial access point equipment, aerial eNodeB equipment, aerial gNodeB equipment, and the like) to offload traffic from terrestrial (or land based) networking architectures, in order to ameliorate high traffic volumes due, for example, to special events (e.g., music concerts, political and/or business conventions, tradeshows, sporting events, disaster recovery, . . . ) occurring in one or more defined or determinable geographic areas.

Aerial networking equipment, such as aerial base station equipment, aerial access point equipment, aerial eNodeB equipment, and the like, can be a cell site on a drone. The aerial networking equipment can be designed to beam LTE coverage from the sky to customers on the ground during disasters and/or big events. The aerial networking equipment can carry a small cell and associated antennas. Aerial networking equipment can use satellite or terrestrial based networking equipment as backhaul, to transport text, calls, and data. Aerial networking equipment can operate in extremely remote areas, and where wired and/or wireless infrastructure is not immediately available. Further, aerial networking equipment can provide LTE coverage from the sky to designated areas on the ground. Aerial networking equipment can be easier to deploy due to their small size. Additionally, aerial networking equipment can provide larger coverage footprints than comparable terrestrial networking equipment; due to the fact that aerial networking equipment can potentially fly at altitudes over 300 feet. Moreover, multiple aerial networking equipment flying in formation can be deployed to expand the coverage footprint.

As noted above, aerial networking equipment can be used to add additional capacity to hotspot areas as well as fill in areas the macro-network does not provide coverage; where there are zoning limitations; or where installation of macro-network equipment is prohibitively expensive. As also noted above, aerial networking equipment can carry a small cell (e.g., micro cells, picocells, or femto cells) and antennas. Small cells can be low-powered radio access nodes that can usually have coverage range much smaller than macro cells. Small cell base stations are typically a low-cost, small, and simple unit that connects to the operator LTE network.

Aerial networking equipment can offer many of the benefits to improve data throughput for users, increase capacity in the network, and filling for coverage gaps. The integration of aerial networking equipment with terrestrial base station equipment through a heterogeneous network can be useful in seamless handoffs and increases the user data capacity.

Existing LTE networks use a automatic network relation (ANR) mechanism to dynamically build and maintain optimal neighbor lists for each cell in real time. The ANR mechanism is a self optimization feature used to dynamically build and maintain optimal neighbor lists for each cell in real time. The ANR mechanism constantly maintains optimal neighbor lists per cell by identifying missing neighbors, unused cells, and automatically reconfigures without user intervention. The ANR mechanism operates based on user equipment reporting signal strengths from neighboring cells. Typically, the ANR mechanism increases the number of successful handovers and leads to less dropped connections due to missing neighbor relations. Use of the ANR mechanism also minimizes manual handling of the neighbor relations when establishing new terrestrial based networking equipment and when optimizing neighbor lists. Further, by using the ANR mechanism time-consuming and costly tasks and the associated operational expenditure can be reduced. Furthermore, the ANR mechanism is ideal for network rollouts where sites are launched one at a time because the mechanism automatically adapts to the changing network topology.

In some embodiment disclosed herein, user equipment can be used to detect and report neighboring cell equipment to serving cell equipment. Reported neighboring cell equipment can be identified by their PCI values. If reported neighboring cell equipment is not in the neighboring list of serving cell equipment, then user equipment can be asked to read and report additional cell information (e.g., EUTRAN cell global identity (ECGI)—a unique cell identifier used globally by mobile network operators). The servicing cell equipment then request IP addresses of neighboring cell equipment from element management system equipment and establishes an X2 tunnel with the unreported neighboring cell equipment. A relationship tuple can then be created between the ECGI/PCI/IP for the unreported neighboring cell equipment. Once the relationship tuple has been created, subsequent user equipment need only report the PCI of the (now-reported) neighboring cell equipment. Serving cell equipment can then commence handover (HO) to the neighboring cell equipment using the established PCI/X2-tunnel table.

When new base station equipment, such as a eNodeB equipment, is established, the new base station equipment needs to select PCI values for all the cells (sectors) it supports. There are 504 unique PCI values in LTE, and 1008 unique PCI values in 5G, so the reuse of PCIs in different cells is unavoidable. Therefore, base station equipment needs to guarantee that the following conditions are met when selecting PCI values: (1) PCI values should not be the same as PCI values in any neighboring cell equipment; and (2) a given cell may have several neighboring cells, these neighboring cells should not have the same PCI values When new base station equipment first commences operation it generally has no knowledge of the PCI values of neighboring cell equipment. In order to identify a non-conflicting PCI value a mathematical model associated with self organizing networking (SON) processes can be used. The SON process searches all used PCI values in a defined geographic area. The PCI value identified by the SON process will be an unused PCI value that can be assigned to the newly established base station equipment. Should there be a subsequent PCI collision, the SON process can re-assign/replace the previously PCI value with a new PCI value to avoid conflict. This approach can take several rounds of trial and error, during this time handover performance to and/or from the newly established base station equipment can be impacted through handover-failures and/or ping-pong events.

In some embodiments set forth herein, traffic offloading can be performed by individual aerial network equipment, though more commonly, traffic offloading can be undertaken by groups or clusters of aerial network equipment (e.g., marshaled or dispersed, for example in one or more various disparate aerial formations). Typically, traffic offloading can last for several hours, though in some instances traffic offloading can be as fleeting as a few minutes (e.g., 5 minutes, 10 minutes, 15 minutes, half an hour, three quarters of an hour, etc.).

In the foregoing instances, hybrid aerial and terrestrial communication systems need to be established and/or deployed rapidly, and generally can deliver fast and reliable connectivity to user equipment (UE), such as smart phones, Internet of Things (IoT) equipment, etc. In some detailed embodiments, aerial network equipment, such as aerial evolved NodeB (eNodeB or eNB) equipment, can operate as user equipment relay devices/equipment, wherein a first logical side of the relay equipment can operate as user equipment attached, for instance, to terrestrial eNodeB equipment while a second logical side can function as aerial eNodeB equipment which in turn can provide coverage to other UE. Aerial networking equipment, such as aerial eNodeB equipment, typically need to use physical cell identity (PCI) values that do not conflict with exiting terrestrial networking equipment (e.g., existing terrestrial or land based cellular networking architectures). In many instances, current wireless network operators do not have full knowledge of the entirety of existing land based cellular networking architectures operational within their respective regions of operation—there can be many multiple major mobile network operator entities operational in respective overlapping, defined, or determinable geographical areas. Currently, the 3GPP (Third Generation Partnership Project) technical specification does not support self PCI configuration procedures for newly established aerial eNodeB equipment. Nevertheless, an existing mechanism that can be beneficial relies on two dimensional coverage maps (e.g., used for land based or terrestrial coverage) for PCI assignment. It has been observed however that the use of such two dimensional coverage maps in regard to PCI assignment in the context of aerial network equipment can take several significant rounds of trial and error to achieve a relative state of quiescence, during which time handover (HO) performance to and/or from the aerial eNodeB equipment can be impacted in terms of HO failures and/or the introduction of undesirable ping-pong (e.g., indecision as to which aerial eNodeB equipment of a collection or clustered formation of aerial eNodeB equipment and/or terrestrial based networking equipment of a constellation of terrestrial or land based networking equipment should be optimally best be used for PCI assignment).

The subject disclosure in accordance with various embodiments provides a smart PCI self configuration system and/or method for aerial networking equipment used in conjunction with terrestrial fourth generation (4G) and/or fifth generation (5G) communication networks to overcome the foregoing issues. The disclosed systems and/or methods can be situated, in some embodiments, at central node global control equipment located on the core network (e.g., mobile edge compute (MEC) equipment, self organized network (SON) equipment, and/or radio access network (RAN) intelligent controller (RIC) equipment. In various embodiments, the disclosed systems and/or methods add additional acts and/or conditions into an automatic network relation (ANR) and handover mechanism. The additional of these additional acts can be utilized to extend support for smart cell configuration PCI to aerial networking equipment in a hybrid aerial and terrestrial communication systems.

With reference to the Figures, FIG. 1 illustrates a smart physical cell identity (PCI) configuration system 100 for aerial network equipment that can used in terrestrial fourth generation (4G) and/or fifth generation (5G) Long Term Evolution wireless networking paradigms. System 100 can overcome PCI limitations and/or conflicts associated with current and existing terrestrial network networking architectures. In some embodiments, system 100 can be central node global control equipment located on the core network. Examples of central node global control equipment can be mobile edge compute (MEC) equipment, self organized network (SON) equipment, or radio access network intelligent controller (RIC) equipment.

As illustrated system 100 can comprise convergence engine 102 that can be communicatively coupled to processor 104, memory 106, and storage 108. Convergence engine 102 can be in communication with processor 104 for facilitating operation of computer and/or machine executable instructions and/or components by convergence engine 102, memory 106 for storing data and/or the computer or machine executable instructions and/or components, and storage 108 for providing longer term storage for data and/or machine and/or computer machining instructions. Additionally, system 100 can receive input 110 for use, manipulation, and/or transformation by convergence engine 102 to produce one or more useful, concrete, and tangible result, and/or transform one or more articles to different states or things. Further, system 100 can also generate and output the useful, concrete, and tangible results, and/or the transformed one or more articles produced by convergence engine 102, as output 112.

In some embodiments, system 100 can be an Internet of Things (IoT) small form factor equipment capable of effective and/or operative communication with a network topology. Additionally in alternative embodiments, system 100 can be any type of mechanism, machine, device, apparatus, equipment, and/or instrument that can be utilized to facilitate smart physical cell identity (PCI) configuration. Examples of types of mechanisms, equipment, machines, devices, apparatuses, and/instruments can include virtual reality (VR) devices, wearable devices, heads up display (HUD) devices, machine type communication devices, and/or wireless devices that communicate with radio network nodes in a cellular or mobile communication system. In various other embodiments, system 100 can comprise tablet computing devices, handheld devices, server class computing machines and/or databases, laptop computers, notebook computers, desktop computers, cell phones, smart phones, commercial and/or consumer appliances and/or instrumentation, industrial devices and/or components, personal digital assistants, multimedia Internet enabled phones, Internet enabled devices, multimedia players, aeronautical/avionic devices associated with, for example, orbiting satellites and/or associated aeronautical vehicles, and the like.

Convergence engine 102 can identity locations of geographical hotspot areas. Hotspot areas can be identified as a defined geographic area comprising networking equipment, such as eNodeBs and/or gNodeBs, that have become overwhelmed due to high data traffic volumes traversing through a geographic hotspot area. In some embodiments, the cause of such high traffic volumes can be due to special events, such conventions, music concerts, and the like, occurring in the geographic areas. In other embodiments, the cause of high traffic volumes of high traffic loads can be due natural disasters, such as the aftermath of typhoons, hurricanes, wild fires, earthquakes, etc. Typically, high traffic volumes can be identified using measurement data, such a returned signal strength indicators (RSSIs), signal to noise ratios (SNRs), received channel power indicators (RCPIs), quality of service (QoS) metrics, reference signal received power (RSRP) data, and the like. Generally, measurement data can be reported back (fed back) from equipment (e.g., networking equipment and/or user equipment) located within a putative hotspot area. Convergence engine 102 can therefore identify a particular geographic area as being a hotspot and to be in crisis as a consequence of high traffic or data volumes based on one or more of the indicators (e.g., RSSI, SNR, RCPI, QoS, RSRP, . . . ) exceeding one or more defined or definable threshold values and/or falling below one or more defined or determinable threshold values.

Convergence engine 102, in response to identifying a hotspot area, can instruct and dispatch one or more unmanned aerial vehicle (e.g., aerial user equipment (aerial UE)) to the hotspot area. In this regard the hotspot area can be identified by groups of global positioning satellite (GPS) coordinates or geo-location coordinates that can identify the hotspot area with various degrees of specificity.

When the aerial UE arrives at the hotspot area (e.g., upon entering the hotspot area), the aerial UE can automatically launch/enable a UE-relay process. Alternatively, the aerial UE upon entry into the airspace above the hotspot area can await for instructions from convergence engine 102 to facilitate initiation of the UE-relay process. The UE at this juncture in time transitions from being an unmanned aerial vehicle (e.g., a pure drone vehicle) to being airborne networking equipment, such as an aerial eNodeB equipment. When the aerial UE transitions from being an ordinary aerial UE device to an airborne networking device, the aerial UE becomes a hybrid device, wherein in at the front end the aerial UE continues to be a UE device, but at the backend, once the UE-relay process has been deployed, the aerial UE is also capable of operating and functioning as networking equipment, such as an eNodeB equipment.

Once the aerial UE transitions to being an aerial hybrid device (also referred to as aerial-eNB equipment or an aerial-eNB device) capable of operating as both aerial UE and airborne networking equipment, convergence engine 102 can select and assign a PCI value to the aerial hybrid device. In some embodiments, convergence engine 102 can assign a random PCI value to the aerial-eNB equipment. In other embodiments, convergence engine 102 can assign a PCI value that has been specifically or intentionally reserved for the aerial-eNB equipment during instances of overwhelming traffic and/or data congestion within hotspot areas. At this time, when convergence engine 102 is assigning PCI values to be used by aerial-eNB equipment situated within a hotspot area, convergence engine 102 can also instruct the aerial-eNB equipment to reject all equipment (e.g., terrestrial and/or aerial based networking equipment and/or terrestrial and/or other aerial UE located within the hotspot area) attach attempts and/or handover attempts to it. The aerial-eNB can reject equipment attach requests and/or handover requests based on various conditions, such as identifiable overloading conditions.

Once convergence engine 102 has directed aerial-eNB to reject all attach requests and/or all handover requests received from terrestrial and/or aerial based networking equipment and/or terrestrial based UE and/or other aerial UE, convergence engine 102 can instruct terrestrial network equipment, such as terrestrial eNodeBs, situated within the hotspot area to assign a high priority to the aerial-eNB. It will be noted that UEs (airborne as well as terrestrial) situated within the hotspot area can attempt to attach and/or handover to the aerial-eNB, but these attachment requests and/or handover requests can, at this point in time, be rejected outright by the aerial-eNB.

Convergence engine 102, based at least in part on the rejected attachment requests and/or handover requests received, by the aerial-eNB, from UEs (e.g., terrestrial and/or airborne) and/or attachment requests and/or handover requests received, by the aerial-eNB, from terrestrial and/or aerial based networking equipment, can collect, collate, rank, and/or order, and store (e.g., to memory 106, storage 108, and one or more database of a collection of associated databases) user equipment international mobile subscriber identifier (UE-imsi) value and/or source-cell-identifier (source-cell-ID) value data. It should be observed that the UE-imsi values and/or source-cell-ID values are those values associated with equipment within the defined geographic hotspot area that solicit attachment requests and/or handover requests from the aerial-eNB.

Convergence engine 102 can the use the UE-imsi values and/or source-cell-ID values to communicate with other core network equipment to obtain PCI and/or evolved universal mobile telecommunication system (UMTS) terrestrial radio access network (EUTRAN) cell global identity (ECGI) data for each of the UE-imsi values and/or source-cell-ID values associated with the respective equipment that solicited attachment requests and/or handover requests from the aerial-eNB. Additionally, convergence engine 102, from these other core network equipment, can also obtain corresponding neighboring-list (NL) data.

Convergence engine 102 can continue acquiring UE-imsi values and/or source-cell-ID values for a defined or definable duration of time. Generally, the defined or definable duration of time can be determined as to when convergence is reached. Typically, convergence is reached when no new neighbor network equipment within the defined hotspot geographic area are reported. In this regard it should be noted that in disaster situations, such as earthquakes, hurricanes, tornado touch downs, etc., many network equipment devices within a defined hotspot area can have been rendered inoperable with the consequent result that previously established coverage and/or topological mappings can now have changed and can have been rendered obsolete. In such cases, the PCI values and/or ECGI values can differ from previously established coverage maps and/or topological maps generated and/or developed before the disaster event.

Convergence engine 102 at this stage can select a PCI value that does not conflict with PCI values associated with neighboring network equipment (e.g., neighboring terrestrial eNodeB equipment) and that equipment that is not also included in the neighboring network equipment's neighbor list.

In instances where convergence cannot be achieved (e.g., when, after the elapse of a defined or definable duration of time, additional neighbor network equipment within the defined hotspot geographic area are still being reported) and/or when convergence engine 102 determines, based, for example, on one or more pre-established or determinable threshold values associated with a length of the NL, that the neighboring network equipment's neighbor list (NL) is too large to identify a viable and/or usable PCI and/or ECGI, convergence engine 102 can instruct the aerial-eNB equipment to relocate and hover at alternative GPS coordinates within the defined hotspot area. Additionally and/or alternatively, convergence engine 102 can instruct the aerial-eNB equipment to change hovering altitudes (e.g., up or down) at the initial GPS coordinates within the hotspot area, or change hovering altitudes at the alternative GPS coordinates. While the aerial-eNB equipment is changing location and/or changing altitude, convergence engine 102 can direct the aerial-eNB equipment to continue collecting UE-imsi values and/or source-cell-ID values for equipment located within the hotspot area. It should be noted that when aerial-eNB equipment is changing altitudes the detection coverage umbrae and/or penumbrae can vary at different hovering altitudes, wherein the detection coverage umbrae and/or penumbrae can generally be greater when aerial-eNB equipment are hovering at higher altitudes than when aerial-eNB equipment are hovering at lower altitudes. Thus, by lowering the attitude at which aerial-eNB equipment are hovering can result in the faster acquisition of the NL, commensurately shorter NLs, and a potentially faster selection of a list of PCI values that can be assigned for use by aerial-eNB equipment.

Once a PCI value that does not conflict with neighboring terrestrial networking equipment operational in the hotspot area has been identified and assigned for use by aerial-eNB equipment operating within a defined hotspot area, convergence engine 102 can direct aerial-eNB equipment to re-launch or re-enable the UE-relay process, but in re-launching and/or re-enabling the UE-relay process convergence engine 102 can instruct aerial-eNB equipment to allow for attachment and/or handover requests to itself from equipment (e.g., airborne and/or terrestrial UEs and/or airborne and/or terrestrial network equipment), and thus serve the equipment located within the hotspot coverage area.

In regard to the foregoing it should be noted that the attachment and/or handover processes between terrestrial networking equipment within the hotspot area is generally not affected during the time that convergence engine 102 is searching for PCI values to assign to aerial-eNB equipment.

Figure 2:
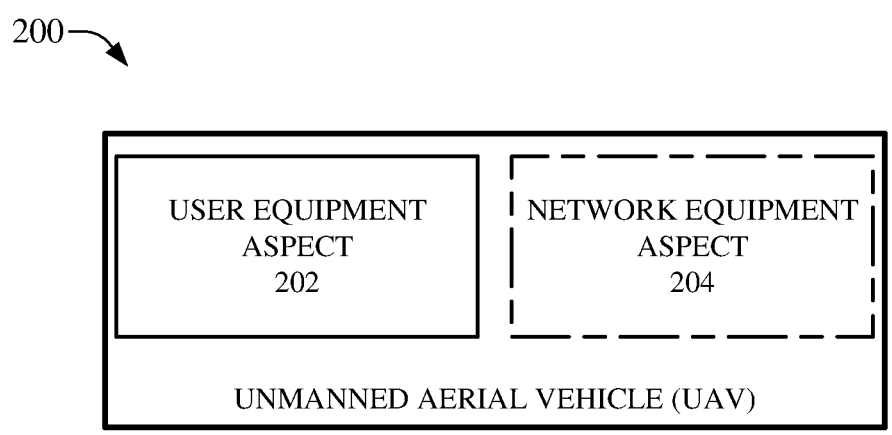
FIG. 2 is a depiction of a further system that provides physical cell identity values for aerial network equipment in terrestrial 4G and/or 5G LTE networking applications, in accordance with aspects of the subject disclosure.

FIG. 2 depicts an illustrative unmanned aerial vehicle 200 that can be used in terrestrial fourth generation (4G) and/or fifth generation (5G) Long Term Evolution wireless networking paradigms. Unmanned aerial vehicle 200 can an airship, such as blimp, an aeronautical vehicle, a drone, a tethered balloon, and the like. Unmanned aerial vehicle 200 in accordance with various embodiments can comprise a user equipment aspect 202, and a network equipment aspect 204. User equipment aspect 202 can be a default status for unmanned aerial vehicle 200. More particularly, unmanned aerial vehicle 200 is by default operational as user equipment. As such, unnamed aerial vehicle 200 in some embodiments can comprise Internet of Things (IoT) small form factor equipment capable of effective and/or operative communication with a network topology. Additionally in alternative embodiments, unnamed aerial vehicle 200 can be any type of mechanism, machine, device, apparatus, equipment, and/or instrument capable of flight that can be utilized to facilitate smart PCI configuration. Generally, unmanned aerial vehicle 200, when operational in both the user equipment aspect 202 and the network equipment aspect 204 can comprise a processor for facilitating operation of computer and/or machine executable instructions and/or components, a memory for storing data and/or the computer or machine executable instructions and/or components, and storage for providing longer term storage for data and/or machine and/or computer machining instructions. Additionally, unmanned aerial vehicle 200 can receive input for use, manipulation, and/or transformation by the processor to produce one or more useful, concrete, and tangible result, and/or transform one or more articles to different states or things. Further, unmanned aerial vehicle 200 can also generate and output the useful, concrete, and tangible results, and/or the transformed one or more articles produced by the processor, as output.

In accordance with some embodiments, unmanned aerial vehicle 200 while operational in the user equipment aspect 202 can be directed to travel or relocate to a geographic hotspot area identified by network equipment (e.g., by convergence engine 102). Unmanned aerial vehicle 200, operating as user equipment (e.g., operational under the user equipment aspect 202), can use GPS coordinates to navigate and fly to the identified geographic hotspot area. Once unmanned aerial vehicle 200 arrives at the geographic hotspot area represented by the GPS coordinates supplied by the network equipment, unmanned aerial vehicle 200 can initiate a UE-relay process that instantiates network equipment aspect 206. When network equipment aspect 206 has been instantiated, the unmanned aerial vehicle 200 transitions from being solely a user equipment device to being a hybrid user equipment/network equipment device—an aerial-eNB device or aerial-eNB equipment, wherein the aerial-eNB equipment has, once the UE-relay process is initiated, two concurrent functional aspects, a first operational aspect that is to operate as user equipment (e.g., operate as a typical aerial drone) and a second operational aspect that is to operate as typical, albeit airborne, network equipment (e.g., base station equipment, eNodeB equipment, gNodeB equipment, etc.).

Figure 3:
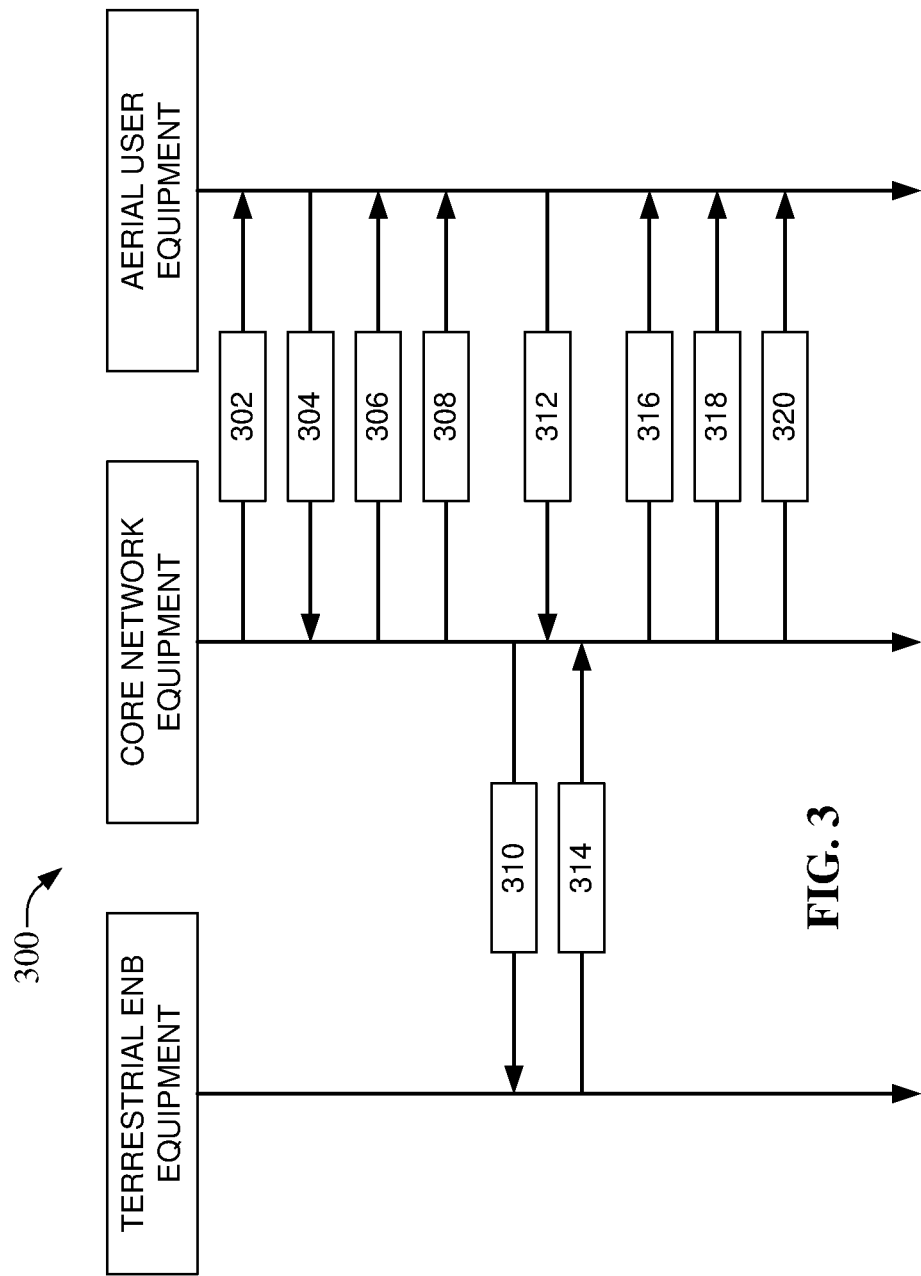
FIG. 3 provides depiction of a time sequence chart for the provision of physical cell identity values for aerial network equipment in terrestrial 4G and/or 5G LTE networking applications, in accordance with aspects of the subject disclosure.

FIG. 3 illustrates an example time sequence chart 300 that can be used to facilitate PCI configuration for aerial network equipment that can used in terrestrial fourth generation (4G) and/or fifth generation (5G) Long Term Evolution wireless networking paradigms. In regard to time sequence chart 300, at act 302, central node global control equipment, such as MEC equipment, SON equipment, RIC equipment, and the like, can identify geographic hotspot areas that have become overwhelmed due to high traffic volumes flowing through networking equipment located in the hotspot area. As has been noted earlier, causes for high traffic volumes can be due to special events, such as conventions, music concerts, disaster situations, and the like, occurring in the hotspot area. As has also been observed, high traffic volumes can be determined based at least in part on measurement metrics and/or measurement data, such as RSSIs, SNRs, RCPIs, QoS, RSRP data, and the like, that can have been sent back, directly and/or indirectly, to the central node global control equipment by various equipment, such as user equipment, base station equipment, IoT equipment, access point equipment, microcell equipment, picocell equipment, femtocell equipment, etc. located within the hotspot area.

Also at act 302, in response to identifying a geographic hotspot area an instruction can be forwarded to drone user equipment (e.g., unmanned aerial vehicle 200). The instruction forwarded to the drone user equipment can be a grouping of GPS coordinates or a collection of geo-location tags that can identify a defined peripheral boundary that encircles the identified geographic hotspot area.

On receiving the instruction the drone user equipment can become airborne and travel to the hotspot area identified by the grouping of GPS coordinates or a collection of geo-location tags. It should be noted that in some embodiments a single drone user equipment can be dispatched to the geographic hotspot area based on the collection of geo-location tags or grouping of GPS coordinates, whereas in additional and/or alternative embodiments, multiple drone user equipment can be sent to the hotspot area based on the collection of geo-location tags or grouping of GPS coordinates. In this regard it should be observed that the drone equipment can typically be situated in one or more proximate location close to the identified geographic hotspot area. However, there can be instances where drone user equipment can be marshaled from one or more disparate and/or distant locations that are not proximate to the identified hotspot.

Thus in some embodiments, drone user equipment, if located centrally in a single location, in response to receiving instructions to travel to a hotspot location based on a defined collection of geo-location tags or a determinable grouping of GPS coordinates, can become airborne, form a flying formation, and collectively travel to the hotspot area. In other embodiments, where a plurality of drone user equipment units are diversely located (e.g., different geographic regions) each of the plurality of drone user equipment units, for example, can initially and individually travel to a common meeting point (e.g., inside the hotspot area or outside the hotspot area), and then collectively form a flying formation to blanket the hotspot area.

Once drone user equipment have arrived at the hotpot area (or when the drone user equipment cross over a boundary that demarcates the hotspot area), the drone equipment can enable a UE-relay process. The UE-process, once initiated, transitions the drone user equipment from being an ordinary user equipment device to being an airborne networking device with one or more capabilities, for example, of base station equipment, microcell equipment, macrocell equipment, picocell equipment, femtocell equipment, or other suitable equipment. Stated alternatively, when the UE-process is initiated, the drone user equipment becomes, for example, a hybrid device; an aerial-eNB equipment with the facilities and/or functionalities of both user equipment at the frontend and networking equipment and the backend. At this stage the aerial-eNB equipment, at act 304, can report back to the core network equipment that it has arrived (or crossed into the area demarcated by the defined collection of geo-location tags or a determinable grouping of GPS coordinates) and that it has initiated the UE-relay process.

Core network equipment in response to receiving confirmation that aerial-eNB equipment has entered into the hotspot area and has successfully enable the UE-relay process, at act 306, in an embodiment can randomly assign a PCI value to the aerial-eNB equipment. In an additional and/or alternative embodiment, core network equipment, at act 306, can assign a reserved or pre-established PCI to the aerial-eNB equipment.

At act 308, core network equipment can instruct aerial-eNB equipment to reject attempts, by all UE within the hotspot area and/or all terrestrial based networking equipment situated within the hotspot area, to attach to it and/or to handover to it. In some embodiments, aerial-eNB equipment, at this instance of time, can automatically reject attachment and/or handover requests based, for example, various conditions, such as overloading conditions (e.g., load=high). In additional and/or alternative embodiments, aerial-eNB the rejection of attachment and/or handover requests can be facilitated by core network equipment.

At act 310, core network equipment can instruct terrestrial network equipment situated within the geographic hotspot area demarcated by the defined collection of geo-location tags or a determinable grouping of GPS coordinates to assign a high priority to the aerial-eNB equipment.

In the interim at act 312, aerial-eNB equipment, for each rejected attachment request and/or each rejected handover request received from all UE within the hotspot area and/or all terrestrial based networking equipment within the hotspot area, can report back to core network equipment data such as relevant international mobile subscriber identifier (imsi) values and/or relevant source cell identifier values associated with the equipment that have had their attachment requests and/or handover requests rejected by aerial-eNB equipment. Core network equipment can store the data fed back by aerial-eNB equipment as tuples to associated database equipment of collections of database equipment. In regard to storing the data returned by aerial-eNB equipment to core network equipment, this data can also be stored to one or more memories associated with core network equipment and/or to one or more longer storage equipment (e.g., cloud storage equipment) that can also be associated with core network equipment.

During, and/or concurrently with, acts 310 and 312, core network equipment can collaborate and communicate with other core network equipment and/or terrestrial based networking equipment (both within the hotspot area and outside the hotspot area) to acquire PCI values and/or ECGI values that correspond with the relevant international mobile subscriber identifier (imsi) values and/or relevant source cell identifier values associated with the equipment that have had their attachment requests and/or handover requests rejected by aerial-eNB equipment.

At act 314 terrestrial network equipment within the hotspot area can return the neighbor lists (NLs) to core network equipment. Core network equipment can thereafter use the neighbor lists received from the terrestrial network equipment located within the hotspot area to determine a listing of neighboring terrestrial network equipment of the neighbor terrestrial network equipment. For example, first terrestrial network equipment can have returned a first neighbor list that comprises terrestrial network equipment A, B, and C that are immediate neighbors of the first terrestrial network equipment, and a second terrestrial network equipment can return a second neighbor list that comprises terrestrial network equipment C, D, and E that are immediate neighbors of the second terrestrial equipment. Core network equipment can determine from the respectively returned neighbor lists that terrestrial network equipment C is a common immediate neighbor of both the first terrestrial network equipment and the second terrestrial network equipment, that terrestrial network equipment A and B are neighbors once removed from the perspective of the second terrestrial network equipment (e.g., neighbors of immediately neighboring equipment), and that terrestrial network equipment D and E are neighbors once removed from the perspective of the first terrestrial network equipment.

At act 316 core network equipment can determine whether convergence has been attained. Convergence is generally achieved when no additional terrestrial neighbor network equipment located within the defined hotspot geographic area is reported back to the core network equipment. It should once again be observed that in disaster situations that many terrestrial network equipment situated within the hotspot area can have been rendered inoperable, and as such previously established coverage maps and/or topological feature charts can have become obsolete as a consequence of the disaster. In such cases, the PCI and ECGI values can differ from previously established coverage maps and/or topological maps that had been developed prior to the disaster.

At act 316, if convergence has been attained, core network equipment can select a PCI value that does not conflict with any other PCI value associated with neighboring terrestrial network equipment located in the hotspot area, and further does not conflict with any other PCI value associated with neighbor of neighboring terrestrial network equipment situated within, or outside, the hotspot area. Core network equipment can forward the selected PCI value for use by the aerial-eNB equipment together with instructions to re-launch the UE-relay process and allow the aerial-eNB equipment to accept attachment and handover requests from all equipment located within the hotspot area.

At act 318, when core network equipment is not able to determine that convergence has been reached, because after an elapse of a defined or definable duration of time additional neighbor terrestrial network equipment located within the hotspot area are still being reported, and/or because core network equipment determines, based, for example, on one or more threshold values associated with lengths of neighbor lists having been exceeded to identify a useable PCI and/or ECGI value, core network equipment can instruct aerial-eNB equipment to relocate to and hover over alternative GPS coordinates within the hotspot area. Additionally and/or alternatively, core network equipment can direct aerial-eNB to change hovering altitudes at the initial GPS coordinates with the hotspot area, or change hovering altitudes over alternative GPS coordinates. While the aerial-eNB equipment is changing location and/or changing altitudes, core network equipment can also direct the aerial-eNB equipment to continue collecting UE-imsi values and/or source cell ID values for equipment located within the hotspot area.

At act 320, once a PCI value that does not conflict with neighboring terrestrial network equipment operational within the hotspot area has been identified, by core network equipment, for use by aerial-eNB equipment, core network equipment can instruct aerial-eNB equipment to re-launch the UE-process and further direct aerial-eNB to all for attachment and/or handover requests from all equipment (e.g., terrestrial based user equipment, aerial based user equipment, terrestrial based networking equipment, or any other appropriate equipment).

In view of the example system(s) described above, example method(s) that can be implemented in accordance with the disclosed subject matter can be better appreciated with reference to the flowcharts in FIGS. 4-7. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

Figure 4:
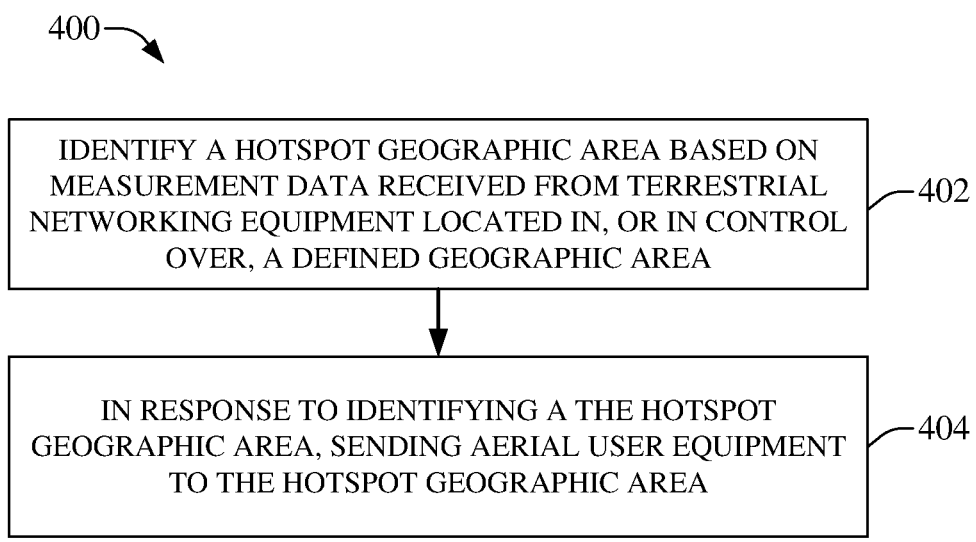
FIG. 4 provides illustration of a flow chart or method for the provision of physical cell identity values for aerial network equipment in terrestrial 4G and/or 5G LTE networking applications, in accordance with aspects of the subject disclosure.

FIG. 4 illustrates a method 400 that can be used to facilitate smart PCI configuration for aerial network equipment that can used in terrestrial 4G and/or 5G LTE wireless networking paradigms. Method 400 can be performed by core network equipment (e.g., core network equipment 100) wherein at 402 when core network equipment identifies a hotspot geographic area, based, for example, on returned measure reports comprising measurement data received from one or more terrestrial networking equipment located within the hotspot geographic area, core network equipment can, at act 404, can dispatch aerial user equipment (e.g., drone user equipment) to the identified hotspot geographic area.

Figure 5:
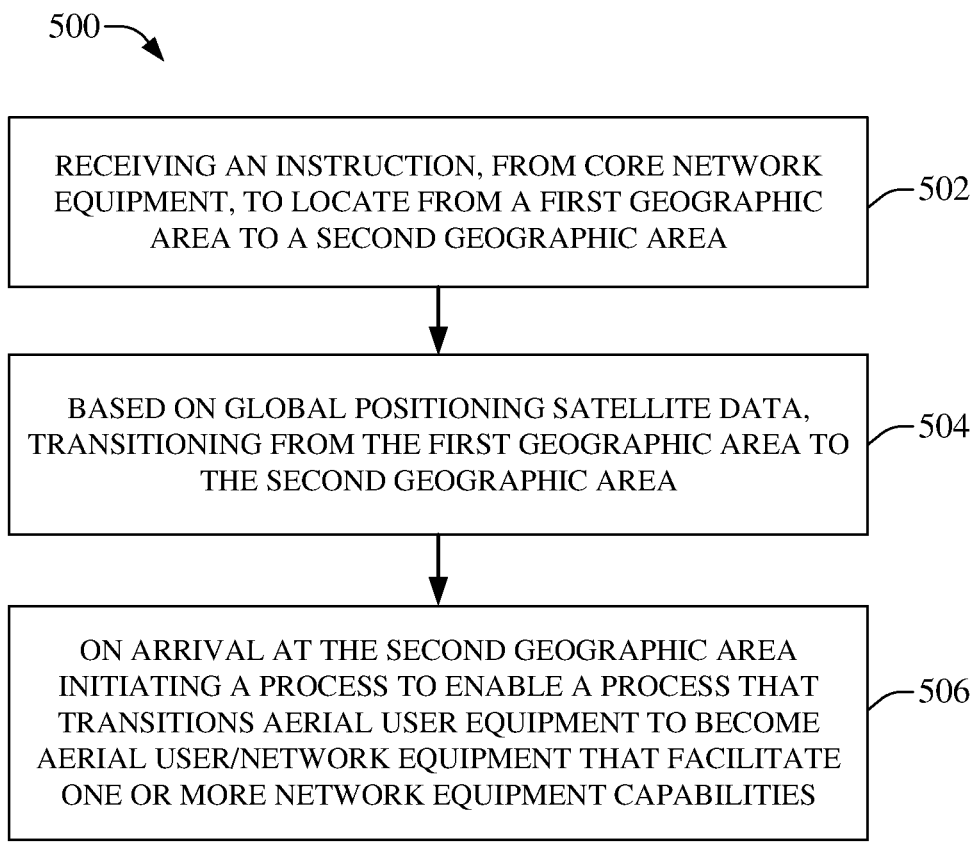
FIG. 5 provides illustration of a flow chart or method for the provision of physical cell identity values for aerial network equipment in terrestrial 4G and/or 5G LTE networking applications, in accordance with aspects of the subject disclosure.

FIG. 5 illustrates a method 500 that can be used to facilitate smart PCI configuration for aerial network equipment that can used in terrestrial 4G and/or 5G LTE wireless networking paradigms. Method 500 can be implemented on aerial user equipment, such as drone user equipment. At act 502, aerial user equipment can receive instructions from core network equipment to locate from a first geographic area represented, for example, by a first group of GPS coordinate values to a second geographic area represented by a second group of GPS coordinate values, wherein the second geographic area represented by the second group of GPS coordinate values area is a hotspot area identified by core network equipment. At act 504, the aerial user equipment, based on the second group of GPS coordinate values that can have been received and included in the instructions from the core network equipment, aerial user equipment can travel from the first geographic area represented by the first group of GPS coordinate values to the second geographic area represented by the second group of GPS coordinate values. At act 506, on arrival at, or on entering, the second geographic area (the identified hotspot area) bounded, for example, by the second group of GPS coordinate values, the aerial user equipment can initiate a UE-relay process that transitions the aerial user equipment to become a hybrid aerial user/network equipment that can facilitate one or more terrestrial network equipment functionality and/or facility.

Figure 6:
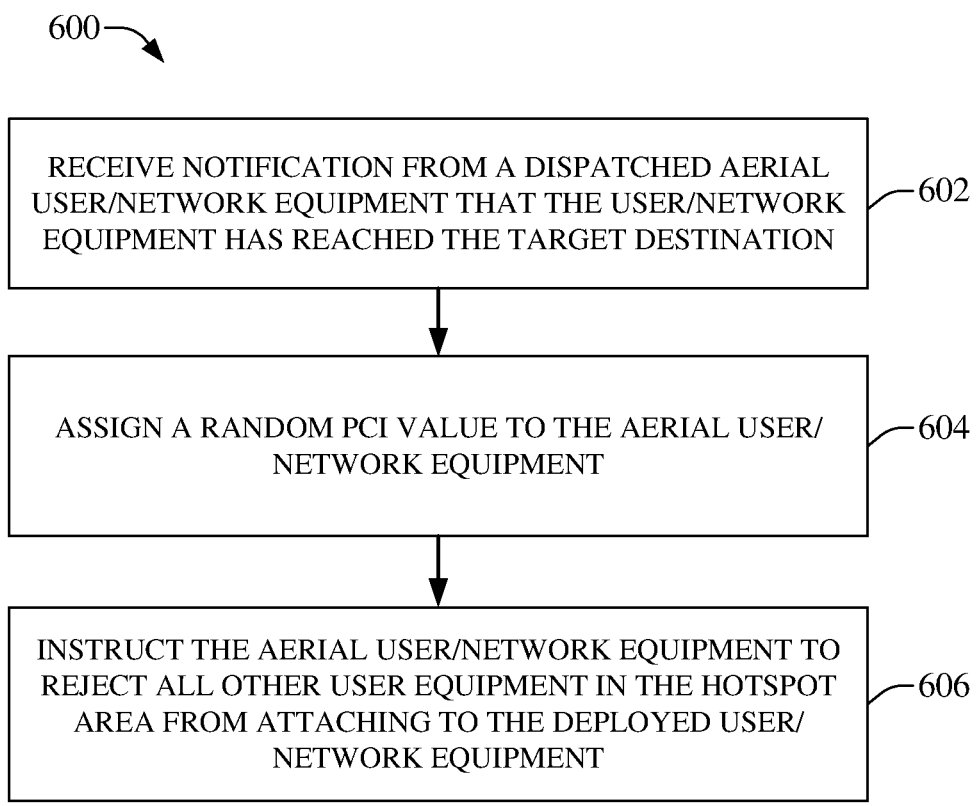
FIG. 6 provides illustration of a flow chart or method for the provision of physical cell identity values for aerial network equipment in terrestrial 4G and/or 5G LTE networking applications, in accordance with aspects of the subject disclosure.

FIG. 6 illustrates a method 600 that can be used to facilitate smart PCI configuration for aerial network equipment that can used in terrestrial 4G and/or 5G LTE wireless networking paradigms. Method 600 can be implemented on core network equipment. At act 602, core network equipment can receive notification the dispatched aerial user equipment that it has initiated the UE-relay process and has transitioned from being aerial user equipment to now being a hybrid aerial user/network equipment. Additionally at act 602, core network equipment can be informed by the hybrid aerial user/network equipment that it has reached its targeted destination (e.g., the identified hotspot area bounded by the second group of GPS coordinate values). At act 604, core network equipment can, in some embodiments, assign a randomly selected PCI value to the hybrid aerial user/network equipment. In other embodiments core network equipment, at act 604, can assign a PCI value that can have been reserved specifically for allocation to hybrid aerial user/network equipment when core network equipment identify a geographic hotspot area. At act 606, core network equipment can instruct hybrid aerial user/network equipment to reject all other equipment (user equipment (aerial and/or terrestrial), network equipment (terrestrial and/or aerial), and the like) situated within the hotspot area bounded, for example, by the second group of GPS coordinate values, from attaching to hybrid aerial user/network equipment and/or handing over to hybrid aerial user/network equipment.

Figure 7:
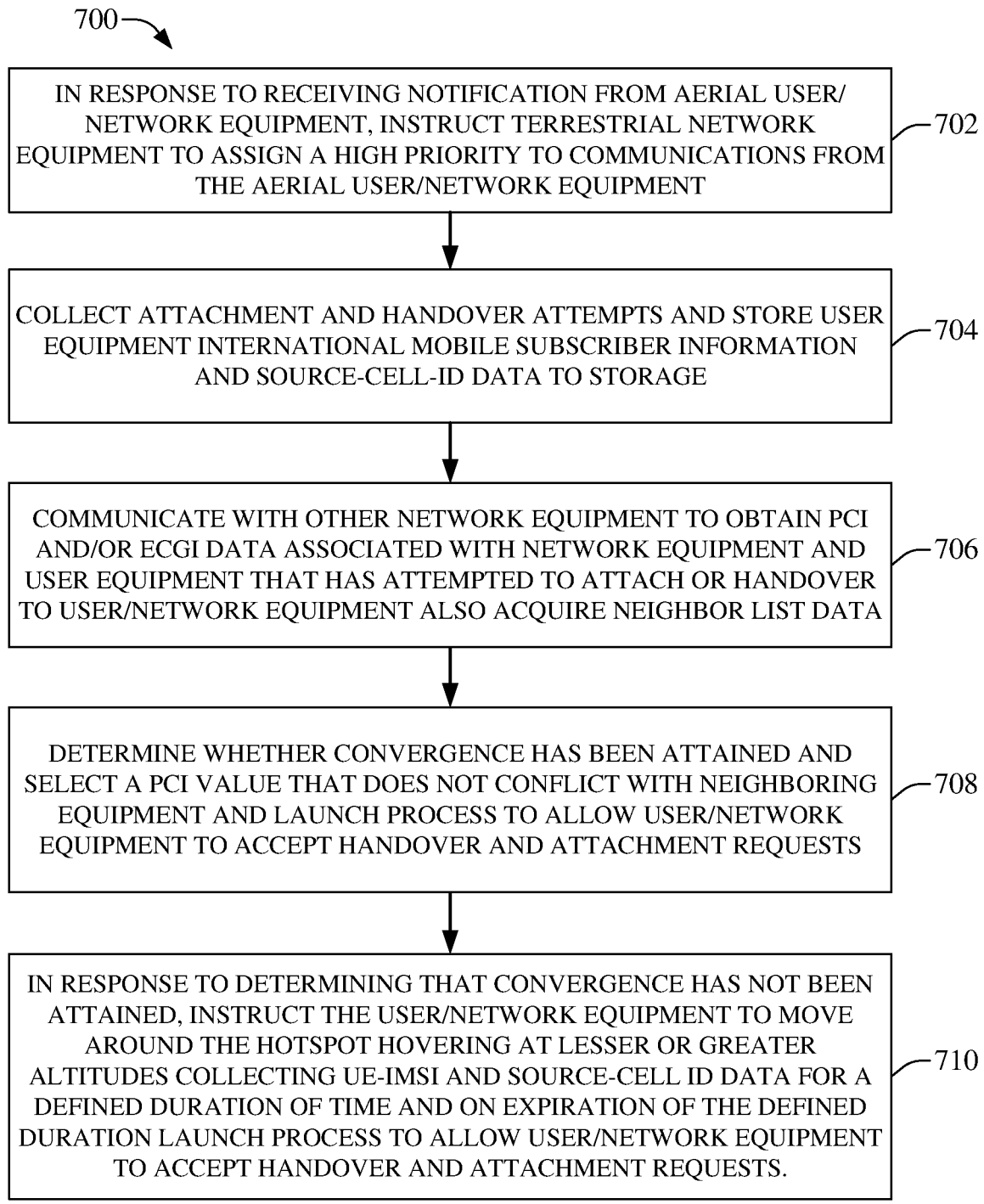
FIG. 7 provides illustration of a flow chart or method for the provision of physical cell identity values for aerial network equipment in terrestrial 4G and/or 5G LTE networking applications, in accordance with aspects of the subject disclosure.

FIG. 7 illustrates a method 700 that can be used to facilitate smart PCI configuration for aerial network equipment that can used in terrestrial 4G and/or 5G LTE wireless networking paradigms. Method 700 can be operational on core network equipment. Method 700 can commence at act 702, wherein core network equipment, in response to receiving notification from hybrid aerial user/network equipment that it has initiated the UE-relay process, can instruct terrestrial network equipment located within the bounded hotspot area to assign a high priority to communications associated with hybrid aerial user/network equipment. At act 704 core network equipment can facilitate, via hybrid aerial user/network equipment, the collection of attachment and/or handover requests that have been directed to hybrid aerial user/network equipment by equipment extant within the hotspot area. Typically, core network equipment can collect and store data associated with each of the attachment and/or handover requests. The data can comprise imsi data and/or source cell ID data. At act 706 core network equipment can communicate with other network equipment (e.g., core network equipment, network equipment located within the hotspot area, network equipment located proximate or abutting a hotspot area, and the like) to obtain PCI and/or ECGI data associated each equipment that forwarded an attachment request and/or handover request to hybrid aerial user/network equipment. Additionally, at 706 core network equipment can also acquire neighbor list data from other core network equipment, terrestrial network equipment located within the bounded hotspot area, and/or network equipment located in areas proximate to the hotspot area. At act 708 core network equipment can determine whether convergence has been attained, and if so, can select a PCI value that does not conflict with neighboring equipment. Convergence can be defined as the stage in which no new PCIs are collected from neighboring equipment located in the hotspot are for a predefined amount of time. At act 708 core network equipment instruct hybrid aerial user/network equipment to re-launch the UE-relay process to allow hybrid aerial user/network equipment to accept handover and/or attachment requests. At act 710 core network equipment, in response to determining that convergence has not been attained, can instruct hybrid aerial user/network equipment to move around the hotspot area hovering at greater or lesser altitudes collecting imsi and source cell ID data for a defined or definable duration of time. On the expiration of the defined or definable duration of time, core network equipment can select a PCI value that does not conflict with neighboring equipment and thereafter re-launch the UE-relay process to allow hybrid aerial user/network equipment to accept handover and/or attachment requests.

Figure 8:
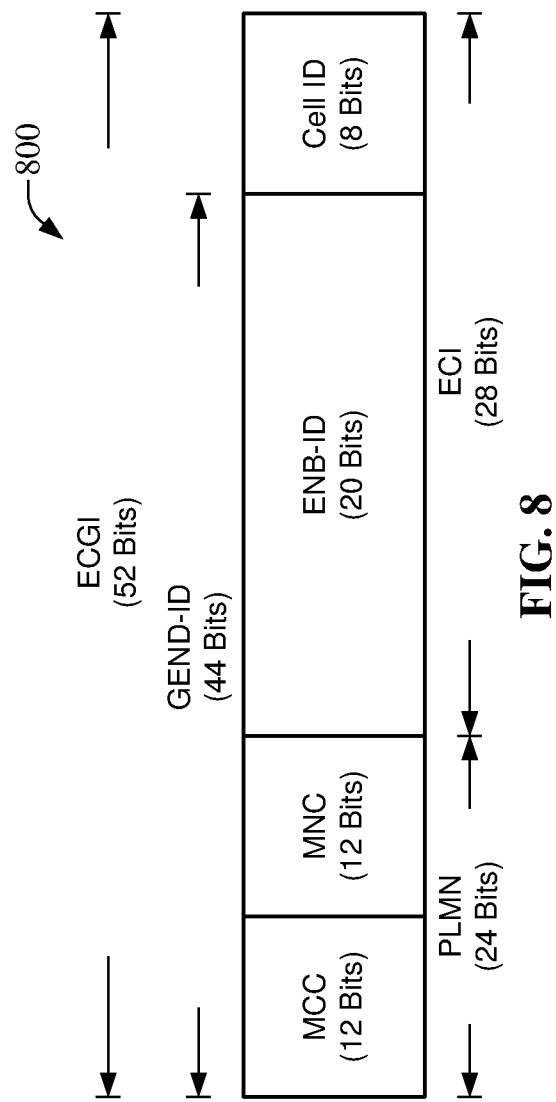
FIG. 8 provides illustration of a EUTRAN cell global identity (ECGI) that can be used as a unique identifier across networks globally, in accordance with aspects of the subject disclosure.

FIG. 8 provides illustration of a EUTRAN cell global identity (ECGI) 800 that can be used as a unique identifier across networks globally. As depicted ECGI 800 can be comprise 52 bits, wherein 44 bits can comprise a global eNodeB ID (GEND-ID) of which 12 bits of the 44 bits can represent a mobile country code (MCC), 12 bits of the 44 bits can represent a mobile network code (MNC), and the remaining 20 bits of the 44 bits can represent an eNodeB ID (ENB-ID). Additionally, the 52 bit ECGI can also include an 8 bit cell ID. Further, from observation of the 52 bit ECGI it will be observed that the 12 bit MCC and 12 bit MNC can form a 24 bit public land mobile network (PLMN) specifier that can uniquely identify a mobile network operator entity. Also it will be noted the 20 bit ENB-ID and the 8 bit cell ID provides a 28 bit EUTRAN cell identity, wherein the 20 bit ENB-ID is an identifier of an eNodeB within one PLMN, and the cell ID is an identifier of sector and carrier.

It should be realized and appreciated by those of ordinary skill, the foregoing non-limiting example use application(s) are merely illustrations of a use to which the disclosed and described solution can be applied and thus are provided solely for the purposes of exposition. The described and disclosed subject matter is therefore not limited to the foregoing example application(s), but can find applicability in other more generalized circumstances and use applications.

Figure 9:
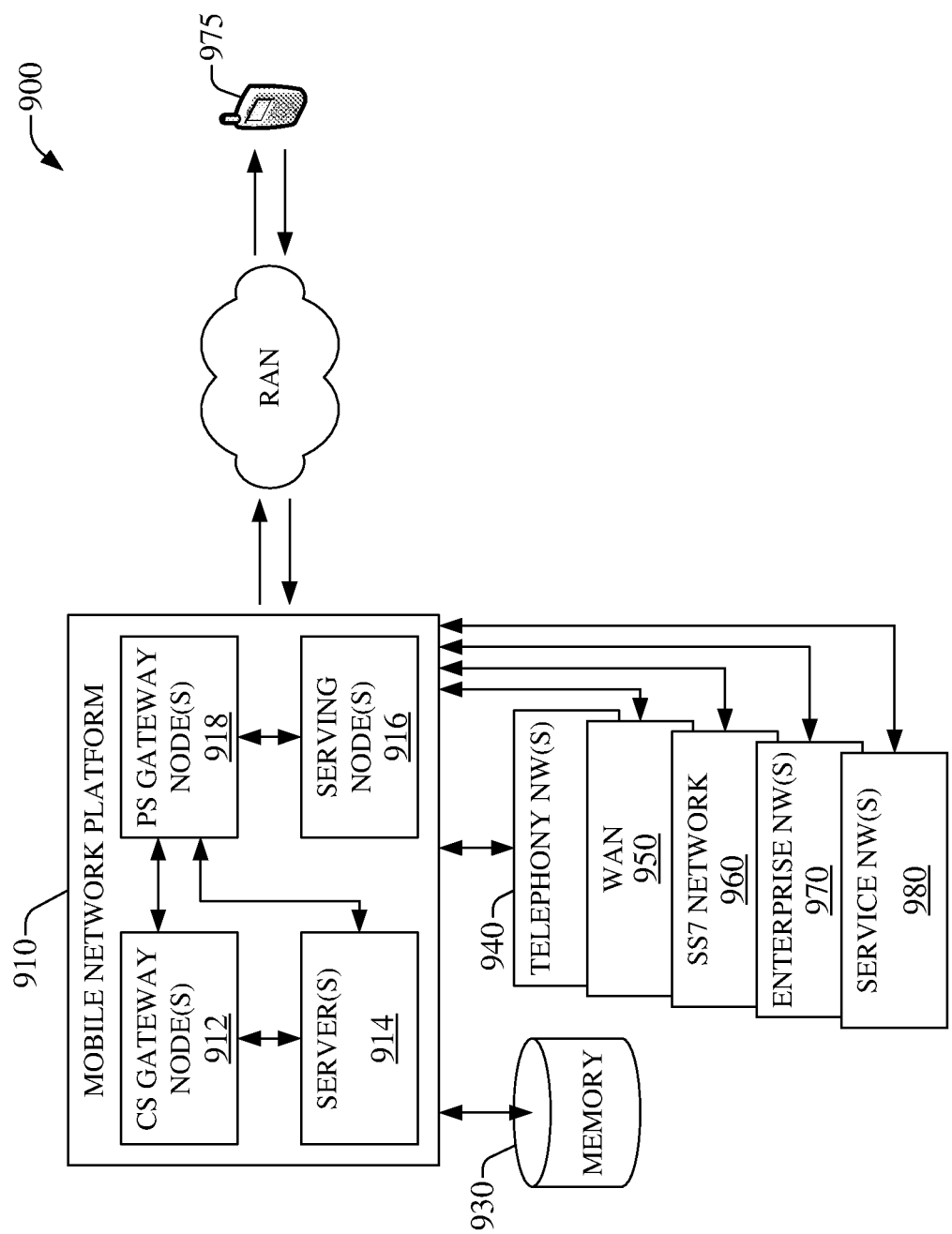
FIG. 9 is a block diagram of an example embodiment of a mobile network platform to implement and exploit various features or aspects of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 970. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
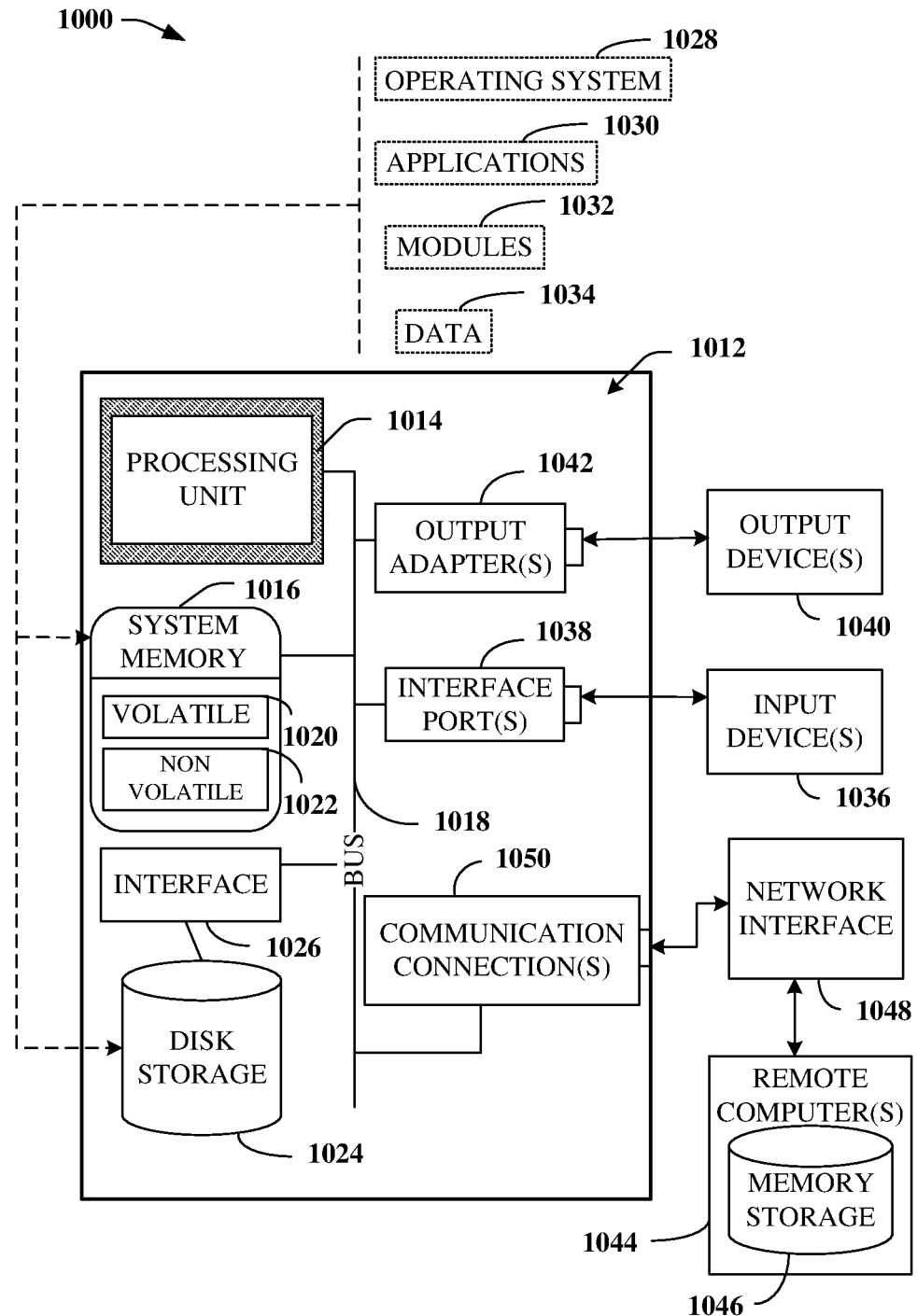
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of the hardware of system 100, includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect, Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

System memory 1016 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) LTE; 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A user equipment, comprising:
 a processor; and
 a memory that stores executable instructions that, when executed by the processor, facilitate performance of operations, comprising:
 based on receiving, from core network equipment, an instruction comprising geographic coordinate data representing a hotspot location, traveling to the hotspot location;
 in response to arriving at the hotspot location, initiating execution of a user equipment relay process that transitions the user equipment from being the user equipment to being aerial hybrid user and network equipment; and
 transmitting to the core network equipment that the user equipment relay process has been initiated.

2. The user equipment of claim 1, wherein the operations further comprise receiving, from the core network equipment, a subsequent instruction, subsequent to the instruction, that instructs the aerial hybrid user and network equipment to reject attachment requests received from a user device located in a hotspot area comprising the hotspot location.

3. The user equipment of claim 1, wherein the operations further comprise receiving, from the core network equipment, a subsequent instruction, subsequent to the instruction, that instructs the aerial hybrid user and network equipment to reject handover requests received from a user device located in a hotspot area comprising the hotspot location.

4. The user equipment of claim 1, wherein the operations further comprise receiving, from the core network equipment, a subsequent instruction, subsequent to the instruction, that instructs the aerial hybrid user and network equipment to reject attachment requests received from network equipment located in a hotspot area comprising the hotspot location.

5. The user equipment of claim 1, wherein the operations further comprise receiving, from the core network equipment, a subsequent instruction, subsequent to the instruction, that instructs the aerial hybrid user and network equipment to reject handover requests received from network equipment located in a hotspot area comprising the hotspot location.

6. The user equipment of claim 1, wherein the operations further comprise receiving, from the core network equipment, a subsequent instruction, subsequent to the instruction, that directs the aerial hybrid user and network equipment to transmit international mobile subscriber identity data associated with a user device that attempts attachment to the aerial hybrid user and network equipment.

7. The user equipment of claim 1, wherein the operations further comprise receiving, from the core network equipment, a subsequent instruction, subsequent to the instruction, that directs the aerial hybrid user and network equipment to transmit international mobile subscriber identity data and source-cell-ID data associated with a user device and network equipment that attempt handover to the aerial hybrid user and network equipment.

8. The user equipment of claim 1, wherein the operations further comprise receiving, from the core network equipment, a subsequent instruction, subsequent to the instruction, that comprises a physical cell identity value for the aerial hybrid user and network equipment to use, and wherein the physical cell identity value distinguishes the aerial hybrid user and network equipment from equipment located in a hotspot area comprising the hotspot location.

* * * * *